United States Patent
Jain et al.

(10) Patent No.: US 7,027,057 B2
(45) Date of Patent: *Apr. 11, 2006

(54) ENTERING AND EXITING POWER MANAGED STATES WITHOUT DISRUPTING ACCELERATED GRAPHICS PORT TRANSACTIONS

(75) Inventors: Satchit Jain, San Jose, CA (US); Debra T. Cohen, Santa Clara, CA (US); Leslie E. Cline, Sunnyvale, CA (US); Barnes Cooper, Beaverton, OR (US); Anil V. Nanduri, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 103 days.

This patent is subject to a terminal disclaimer.

(21) Appl. No.: 10/640,196

(22) Filed: Aug. 12, 2003

(65) Prior Publication Data

US 2004/0032414 A1 Feb. 19, 2004

Related U.S. Application Data

(62) Division of application No. 09/751,441, filed on Dec. 29, 2000, now Pat. No. 6,738,068.

(51) Int. Cl.
*G06F 13/14* (2006.01)
*G06F 1/26* (2006.01)
*G06F 1/32* (2006.01)
*G06F 13/28* (2006.01)
*G09F 5/39* (2006.01)

(52) U.S. Cl. ............ 345/520; 713/320; 713/323; 713/324; 713/330; 713/340; 710/305; 345/531; 345/532; 345/533

(58) Field of Classification Search ........... 345/519, 345/794, 522, 558, 520, 532, 533, 531; 713/322, 713/320, 323, 324, 330, 340, 300; 712/34, 712/32; 710/305, 304, 309, 303, 18, 8, 260; 365/222
See application file for complete search history.

(56) References Cited

U.S. PATENT DOCUMENTS

| | | | |
|---|---|---|---|
| 5,471,625 A * | 11/1995 | Mussemann et al. | 713/322 |
| 5,659,715 A | 8/1997 | Wu et al. | |
| 6,021,506 A | 2/2000 | Cho et al. | |
| 6,052,133 A | 4/2000 | Kang | |
| 6,292,201 B1 * | 9/2001 | Chen et al. | 345/519 |
| 6,434,688 B1 * | 8/2002 | Rhoden et al. | 712/34 |
| 6,738,068 B1 * | 5/2004 | Cohen et al. | 345/519 |

* cited by examiner

*Primary Examiner*—Ulka J. Chauhan
*Assistant Examiner*—Dalip K. Singh
(74) *Attorney, Agent, or Firm*—John F. Travis

(57) ABSTRACT

An interface between an accelerated graphics port graphics controller (AGP-GC) and a core controller to prevent entry into a low power state from interfering with transfers to or from the AGP-GC that have been requested but not completed. The core controller can communicate to the AGP-GC an intent to enter a low power state, while the AGP-GC can communicate to the core controller the busy status of the AGP-GC. When the AGP-GC receives notice of an intent to enter a low power state, it can stop issuing requests to the core controller. When the core controller detects that the AGP-GC is busy, the core controller can postpone entry into the low power state until the AGP-GC completes any requests that are in progress. In an alternate use of the interface, if the AGP-GC wishes to make a request during a low power state, it can signal the core controller of this need by indicating a busy status, which can trigger the core controller to initiate an exit from the low power state.

8 Claims, 4 Drawing Sheets

ENTERING AND EXITING POWER MANAGED STATES WITHOUT DISRUPTING ACCELERATED GRAPHICS PORT TRANSACTIONS

The present patent application is a Divisional of application Ser. No. 09/751,441, filed Dec. 29, 2000, now U.S. Pat. No. 6,738,068.

BACKGROUND OF THE INVENTION

1. Field of the Invention

The invention pertains generally to computer systems. In particular, it pertains to managing transitions between power states in computer systems.

2. Description of the Related Art

As computer design has relied on more and more buses to accommodate increasing volumes of data transfers, many computers have incorporated a chip set, often referred to as the "core", or "core controller", to act as a centralized controller, providing separate interfaces and control logic to connect the processor (CPU), system memory, and various other peripheral devices. In particular, an increased focus on graphics has led to a separate graphics controller, interfaced to the core controller through a dedicated graphics bus. One version of the graphics controller interface is referred to as the Accelerated Graphics Port graphics controller (referred to herein as the AGP-GC), while its connecting bus is referred to as the AGP-GC bus. Read and write requests from the AGP-GC are used to initiate multi-byte memory transfers between the AGP-GC and memory that pass through the core controller. FIG. 1 shows a conventional system 1 with an AGP-GC 13, CPU 11, system memory 14, and peripheral bus controller 15 connected to core controller 10. Peripheral bus controller 15 might actually be several different bus controllers, but is shown as a single consolidated bus controller for simplicity. Core controller 10 may include a graphics/memory control hub (GMCH) 18 to control transfers to/from memory 14 and AGP-GC 13, and an I/O control hub (ICH) 19 to control transfers to/from peripheral bus controller(s) 15.

AGP-GC 13 is connected to core controller 10 through bus 16, which is shown as two separate sub-buses 16A and 16B. These sub-buses are shown separately because they act somewhat independently to perform different functions, even though they can be considered one bus. As shown in FIG. 2, sub-bus 16A, sometimes referred to as the sideband command and address bus (SBA), carries requests from AGP-GC 13 to initiate block transfers to/from memory 14. When such a request is received from AGP-GC 13 by GMCH 18, the request is placed into queue 12 until it can be serviced. When the request is retrieved from the queue, GMCH 18 sets up and initiates the actual data transfer, which takes place over bi-directional sub-bus 16B. Sub-bus 16B can also carry commands from CPU 11 to AGP-GC 13 through GMCH 18.

In a separate development, computer systems have incorporated low-power states to conserve energy, especially in battery-powered systems. Various portions of a computer system, such as the processor and core controller, can be placed in a low-power state when feasible, and reactivated when needed again. In particular, CPU 11 can be placed in various power states, commonly labeled C0 (normal operation), C1 (execute CPU halt instruction and wait for interrupt to restart CPU), C2 (stop CPU clock, but allow other devices to communicate with memory by permitting memory snooping), and C3 (sleep state—stop CPU clock, memory operations, and related bus operations). CPU 11 can be restarted (returned to C0) from states C2 or C3 by a signal from core controller 10, which contains its power, control logic in ICH 19. Deeper sleep states (i.e., C4, C5, etc.) may also exist, but are not as well defined. For the purposes of this disclosure, they can be considered to be included with C3.

Entering low power state C3 can cause problems with the operation of AGP-GC 13 because entry into this state can prematurely terminate any AGP-GC transaction that is in progress, causing a loss of any untransferred data and loss or corruption of any requests remaining in queue 12. Thus, from the time AGP-GC 13 places a request into queue 12 until the time the resulting data transfer has been completed, the system should avoid entering the C3 state. Unfortunately, a conventional AGP-GC interface bus 16 has no handshaking provision to allow AGP-GC 13 to notify GMCH 18 that AGP-GC 13 has a pending request for which the data transfer has not been completed.

A conventional method of minimizing these problems is to communicate the intention to enter a low power state to AGP-GC 13 a predetermined period of time before entering the sleep state by sending a Stop indication to the AGP-GC. This predetermined time period is supposed to be long enough so that AGP-GC 13 can stop issuing requests, and any requests that have already issued will have time to work their way through queue 12 and then complete their data transfers. Since the exact amount of time necessary to do these things is variable and somewhat unpredictable, a time period is chosen that is assumed to be sufficiently long to complete any data transfer that has been requested. A time period of 32 microseconds is typical. If less time is required to actually complete the transfer, the remaining time is wasted, which can affect the efficiency of the system and lead to increased power usage by unnecessarily delaying entry into a sleep state. However, if more than the allotted time is required to complete the transfer, some of the data will be lost when the time period expires and a low power state is entered before the data transfer completes. Thus, the problem of lost data and errors is reduced, but not eliminated, by the use of a predetermined delay between announcing an intent to enter the low power state and the actual entry into the low power state.

DETAILED DESCRIPTION OF THE INVENTION

The invention provides the capability for a graphics controller interface, referred to herein as an AGP-GC, to signal whether it is busy, i.e., whether it has made any uncompleted requests, so that the core controller can delay entering a low power state until the AGP-GC has completed any pending requests. As will be seen, this capability can also be used to initiate an exit from a sleeping state when the AGP-GC has a request to make during a low power state. The invention also provides the capability for the core controller to signal the AGP-GC of an intended entry into a low power state so that the AGP-GC can cease issuing requests to the core controller.

The invention can be implemented with a pair of signals, one from the core controller to notify the AGP-GC of an intent to enter a low power state, and the second from the AGP-GC to notify the core controller whether the AGP-GC has an uncompleted request pending.

Figure 1:
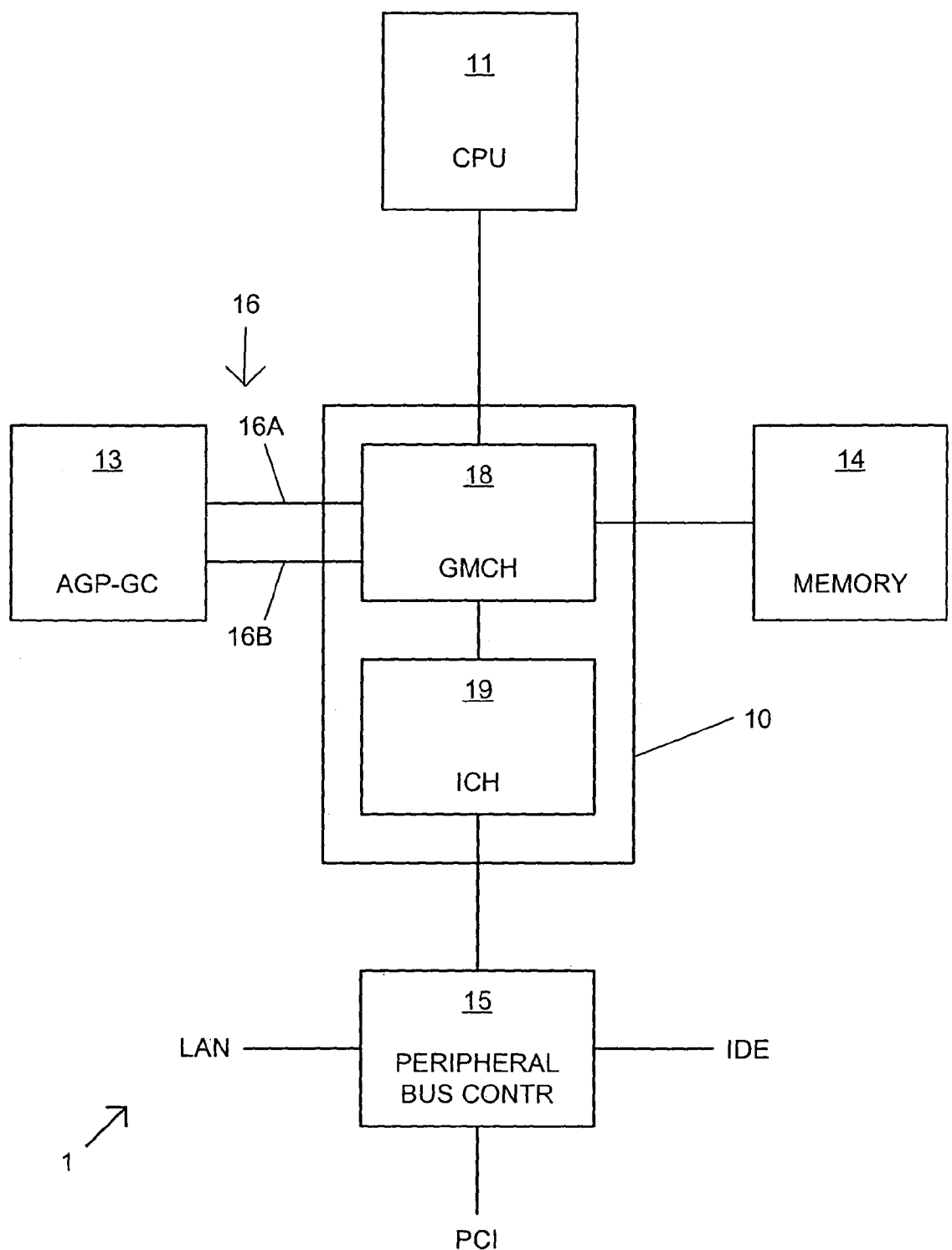
FIG. 1 shows a system of the prior art.
Figure 2:
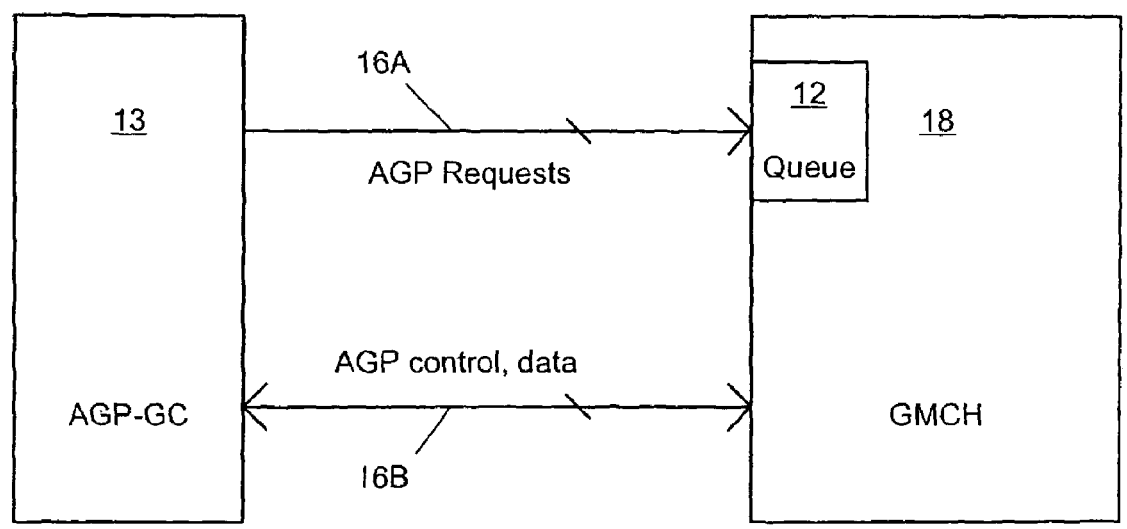
FIG. 2 shows the AGP-GC interface in a prior art system.
Figure 3:
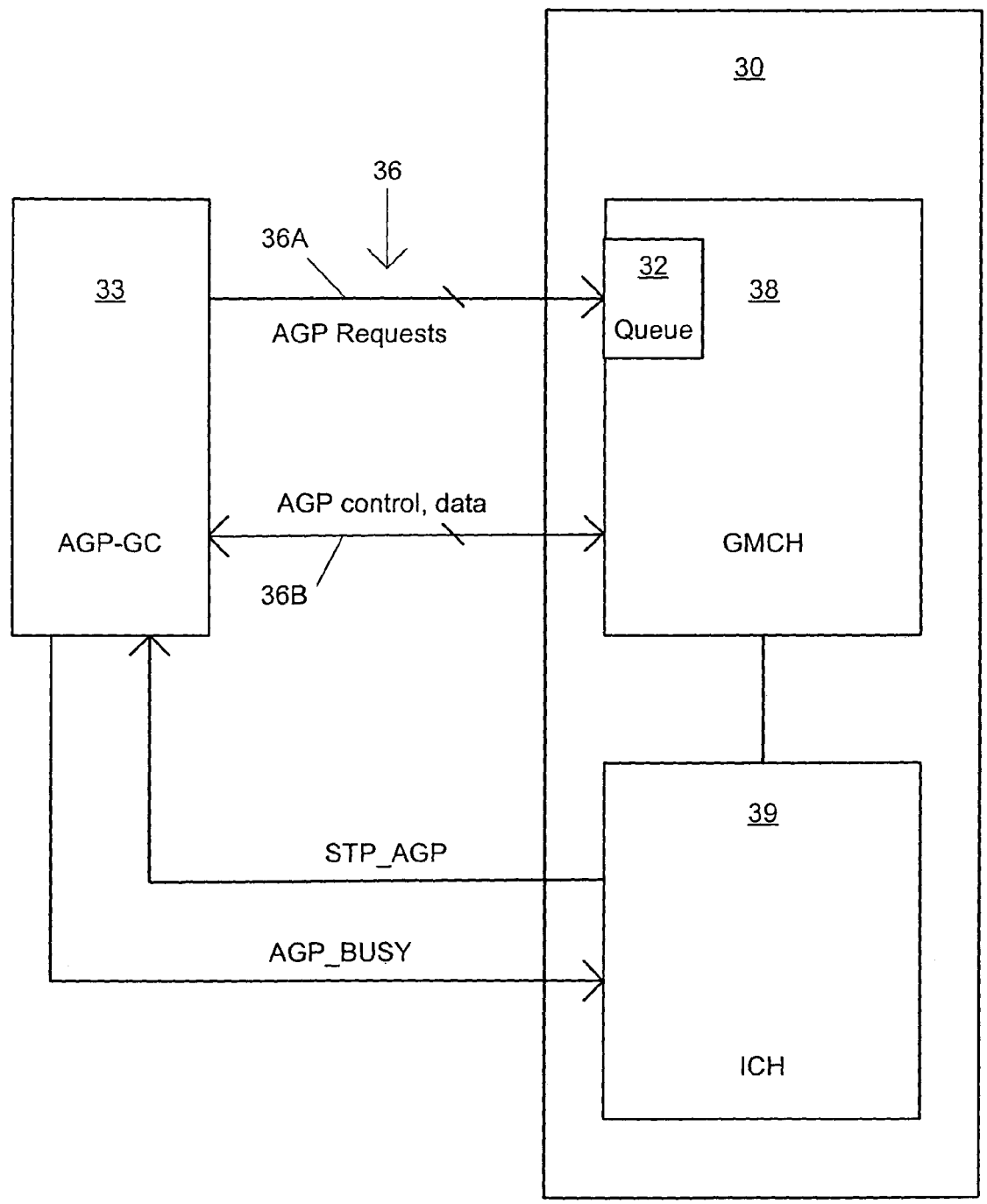
FIG. 3 shows a circuit of an embodiment of the invention.

FIG. 3 shows a portion of a system incorporating the invention. AGP-GC 33 can communicate with core controller 30 over AGP-GC bus 36, which, as in the prior art, can include a sub-bus 36A for requests from the AGP-GC and a sub-bus 36B for data transfers and for commands to the AGP-GC. A diagonal slash through a bus line indicates it is composed of multiple lines, which are shown as a single functional line in the figure for simplicity. Various buses can be used here. Operation of the invention is not dependent the exact number of signal lines and their individual functions.

Core controller 30 can facilitate a data transfer between the AGP-GC and memory be accepting a request from the AGP-GC, establishing a communication with memory, and transferring data between the AGP-GC and memory. Both read and write requests can be facilitated in this manner.

In addition to bus 36, which can be a standard AGP-GC bus, the invention can also include two other control lines, a warning line and a busy line, labeled in FIG. 3 with the signal names STP_AGP and AGP_BUSY, respectively. These lines can be used to control some of the entry and exit sequences of the AGP-GC and the core controller from power managed states. These two signal names have been chosen for their functional descriptiveness (stop AGP-GC and AGP-GC busy), but this should not be interpreted as a requirement that the invention be restricted to a system using these names.

Frequent reference is made in this disclosure to a "sleep state". This term is frequently used to refer to industry-defined low power state C3, a state that prevents AGP-GC requests from being accepted and serviced. States C0–C2 permit AGP-GC requests to be accepted and serviced. The intent is not to rigidly apply the invention only to a pre-defined industry standard. Any reference herein to a sleep state can include any power state that would prevent AGP-GC requests from being accepted and serviced. By the same token, any reference herein to exiting a sleep state can include transitioning from a sleep state into any power state that permits AGP-GC requests to be accepted and serviced.

The stop signal STP_AGP can be asserted by ICH 39 to signal AGP-GC 33 of an intention to enter a sleep state. The decision to enter a sleep state can be made at various points in the system. It can be made in the processor by software, or can be made by circuitry that senses the demands on the system and generates a signal, request, or command to enter a sleep state. The decision can also be distributed, with various parts of the system contributing to the decision. Numerous factors can be considered before deciding to enter a sleep state, since various parts of the system might be affected by the decision. In one embodiment, entry into a sleep state is controlled by system software, based on inputs from various parts of the system, including a signal from core controller 30 requesting such entry. Regardless of where or how the decision is made, it can be communicated to AGP-GC 33 through core controller 30, since the AGP-GC typically only has signal connections with the core controller. In a typical system, power control logic within the core controller is located in ICH 39. Therefore, the signal STP_AGP can be originated in ICH 39 and communicated directly to AGP-GC 33 as shown in FIG. 3. Once STP_AGP is asserted, AGP-GC 33 can have a predetermined time period to stop issuing new requests. In one embodiment, this predetermined time period is one microsecond.

The busy signal AGP_BUSY can be asserted by AGP-GC 33 to core controller 30 to indicate that the AGP-GC is engaged in a transaction that should not be interrupted by a sleep state. AGP_BUSY can be asserted when AGP-GC 33 places a request into queue 32, and AGP_BUSY can be deasserted when the resulting data transfer has been completed.

STP_AGP can be asserted by ICH 39 to indicate to AGP-GC 33 that ICH 39 intends to trigger a sleep state. This signal can alert AGP-GC 33 that AGP-GC 33 needs to stop issuing requests and to complete all requests that have already been issued.

In one embodiment, ICH 39 can check the status of AGP_BUSY before asserting STP_AGP. If AGP_BUSY is asserted when ICH 39 checks its status, ICH 39 can postpone asserting STP_AGP until AGP_BUSY becomes deasserted. If AGP_BUSY is deasserted, indicating that the AGP-GC does not have any pending requests that need to be completed, then ICH 39 can assert STP_AGP, wait for the predetermined time period to see if AGP-GC 33 places any more requests into queue 32, and then wait until the data transfer phase of all pending requests have been completed, including any requests in queue 32 at the time STP_AGP is first asserted and any new requests placed into queue 32 during the predetermined time period. Once the data transfer phases of these pending requests have been completed, core controller 30 can send a signal to the CPU to initiate entry into a sleep state. STP_AGP can remain asserted until the system later exits the sleep state.

In one embodiment, ICH 39 can initiate entry into a sleep state by sending a signal or message to the CPU that a sleep state is desired. This signal or message can also indicate which sleep state is desired, if there are more than one. The CPU can then execute software that directs the various circuits to actually enter the sleep state. This direction can be any of various known methods.

Sometimes AGP-GC 33 will need to initiate a request when the system is already in a sleep state. However, ICH 39 cannot respond to a request while it is in a sleep state. In this instance, the signal AGP_BUSY can be used to request an exit from the sleep state and into a state that permits data transfer requests by the AGP-GC to be executed. When ICH 39 detects an assertion of AGP_BUSY while in a sleep state, ICH 39 can send a signal or message to the CPU to exit the sleep state. When the sleep state has been exited, STP_AGP can be deasserted, signaling AGP-GC 33 that it may send requests to queue 32. In one embodiment, exit is made to state C0. Another embodiment permits an exit to states C1 or C2 if those states allow sufficient operations to continue.

Although the two signals STP_AGP and AGP_BUSY can operate in the manner described above, they can be sufficiently decoupled to allow other processes to occur. There may be circumstances in which the system will ignore an asserted AGP_BUSY signal and enter a sleep state even if the AGP-GC is still busy. By the same token, the system may remain in a sleep state even if the AGP-GC requests an exit from the sleep state by asserting AGP_BUSY.

Figure 4:
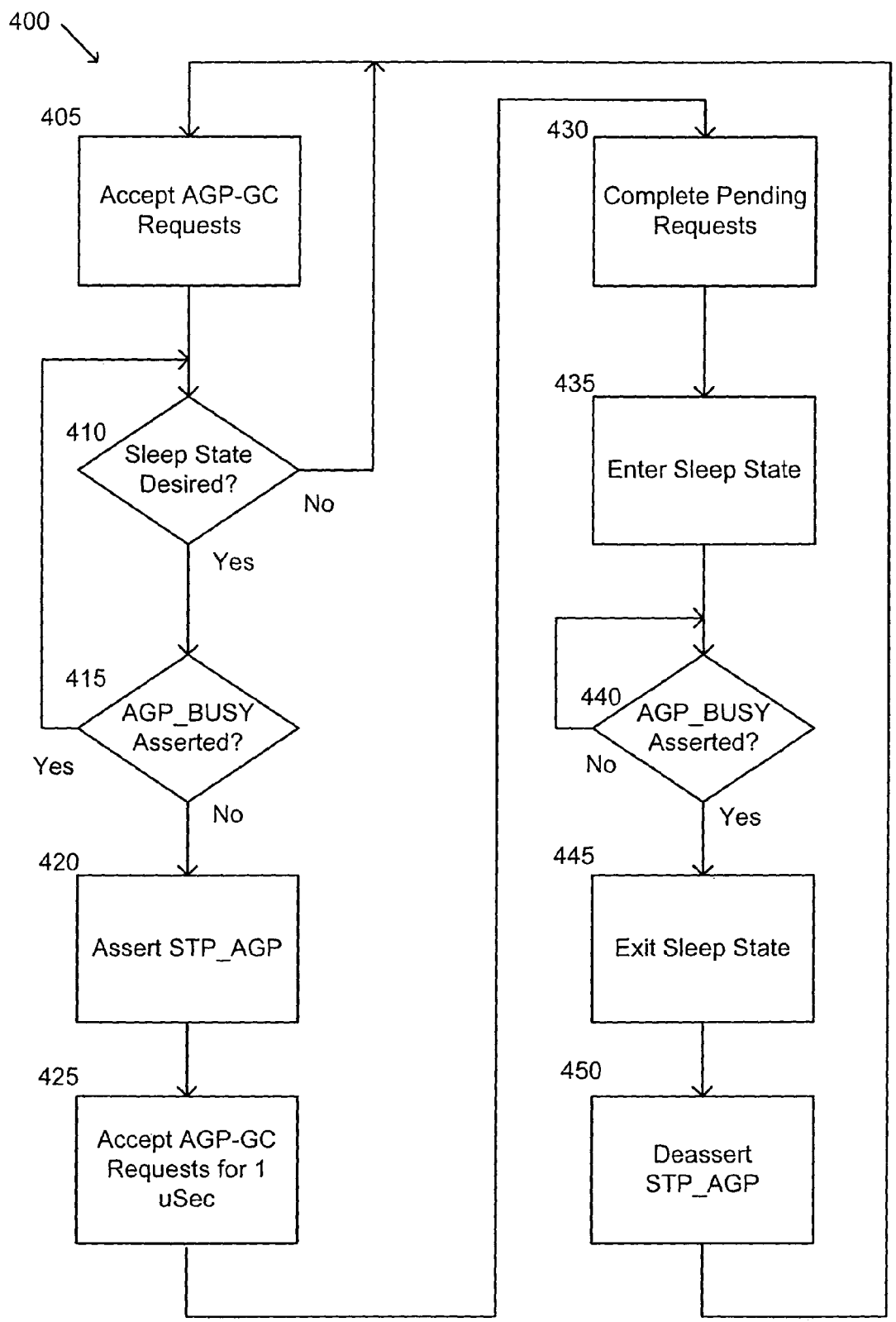
FIG. 4 shows a process of an embodiment of the invention.

FIG. 4 shows a process 400 of the invention. In one embodiment, the steps of this process can be executed within core controller 30. Step 405 can represent an operational state C0, C1, or C2, in which AGP-GC requests are being accepted and processed by core controller 30. If there is no indication that a sleep state is desired, the process can repeatedly loop through steps 405 and 410. However, if a sleep state is desired, the AGP_BUSY signal is checked at step 415. If it is asserted, the AGP-GC is busy processing a request, which has been issued but not completed, and ICH 39 can defer any attempt to enter a sleep state by looping through steps 410 and 415-until the AGP_BUSY signal is deasserted. Note that if the intention to enter a sleep state is withdrawn while AGP_BUSY is being asserted (for example, to service another device that is initiating a memory transfer), the process will revert back to the operational loop between steps 405 and 410.

If AGP_BUSY is deasserted, or becomes deasserted while the system is indicating a sleep state is desired, ICH 39 can assert the signal STP_AGP at step 420. This gives the AGP-GC a predefined time period, such as one microsecond, to stop issuing requests. Requests are accepted during that time period at step 425. At step 430, any pending requests are completed. Pending requests can include any AGP-GC data transfers that are in progress, and any AGP-GC requests that are in queue 32, including any that were issued during the one micro-second period. Once these pending requests, including their data transfers, are completed, ICH 39 can signal the processor to initiate the sleep state, which it does at step 435. Once in the sleep state, ICH 39 can monitor the AGP_BUSY signal. If it remains deasserted, the process can loop at step 440. If AGP_BUSY is asserted, indicating the AGP-GC wishes to make a request that requires the involvement of core controller 30, ICH 39 can signal the processor to exit the sleep state, which it does at step 445. Once core controller 30 has been awakened, it can deassert STP_AGP at step 450, permitting AGP-GC 33 to begin making requests to GMCH 38 again at step 405.

Of course, other events triggered by other devices can also cause the processor to exit the sleep state at step 445, even if the AGP-GC does not assert AGP_BUSY. These events, and the associated process steps, are known to those of skill in the art and are omitted here to avoid obscuring the invention.

The foregoing description is intended to be illustrative and not limiting. Variations will occur to those of skill in the art. Those variations are intended to be included in the invention, which is limited only by the spirit and scope of the appended claims.

We claim:

1. An apparatus, comprising:
   a graphics controller;
   a core controller having:
      an operational state in which the core controller can facilitate a data transfer with the graphics controller; and
      a first low power state in which the core controller cannot facilitate the data transfer with the graphics controller;
   a bus coupled to the graphics controller and the core controller to transfer a request from the graphics controller to the core controller to transfer data;
   a warning line to transfer a first signal from the core controller to the graphics controller to indicate an intent to initiate the first low power state; and
   a busy line to transfer a second signal from the graphics controller to the core controller to indicate the graphics controller requires the core controller to facilitate the data transfer.

2. The apparatus of claim 1, wherein:
   the second signal has a first state and a second state;
   the first state is to indicate that the graphics controller has initiated a request to the core controller to facilitate the data transfer and that the transfer has not been completed; and
   the second state is to indicate that the graphics controller has not initiated a request to the core controller to perform the data transfer that has not been completed.

3. The apparatus of claim 2, wherein:
   the first state is further to indicate, when the core controller is in the first low power state, that the graphics controller has a data transfer request to make to the core controller; and
   the second state is further to indicate, when the core controller is in the first low power state, that the graphics controller does not have a data transfer request to make to the core controller.

4. The apparatus of claim 1, wherein:
   the core controller has a second low power state in which the core controller can facilitate the data transfer with the graphics controller.

5. A system, comprising:
   a processor;
   a memory;
   a graphics processor;
   a core controller coupled to the processor and the memory, the core controller having:
      an operational state in which the core controller can facilitate a data transfer with the graphics controller; and
      a first low power state in which the core controller cannot facilitate the data transfer with the graphics controller;
   a bus coupled to the graphics controller and the core controller to transfer a request from the graphics controller to the core controller to transfer data;
   a warning line to transfer a first signal from the core controller to the graphics controller to indicate an intent to initiate the first low power state; and
   a busy line to transfer a second signal from the graphics controller to the core controller to indicate the graphics controller requires the core controller to facilitate the data transfer.

6. The system of claim 5, wherein:
   the second signal has a first state and a second state;
   the first state is to indicate that the graphics controller has initiated a request to the core controller to facilitate the data transfer and that the transfer has not been completed; and
   the second state is to indicate that the graphics controller has not initiated a request to the core controller to perform the data transfer that has not been completed.

7. The system of claim 6, wherein:
   the first state is further to indicate, when the core controller is in the first low power state, that the graphics controller has a data transfer request to make to the core controller; and
   the second state is further to indicate, when the core controller is in the first low power state, that the graphics controller does not have a data transfer request to make to the core controller.

8. The system of claim 5, wherein:
   the core controller has a second low power state in which the core controller can facilitate the data transfer with the graphics controller.

* * * * *